United States Patent
Kacetl et al.

(10) Patent No.: US 11,632,034 B2
(45) Date of Patent: Apr. 18, 2023

(54) METHOD AND SYSTEM FOR PRESELECTING SWITCHING STATES FOR A MULTI-LEVEL CONVERTER

(71) Applicant: Dr. Ing. h.c. F. Porsche Aktiengesellschaft, Stuttgart (DE)

(72) Inventors: Tomas Kacetl, Kaiserslautern (DE); Stefan Götz, Forstern (DE); Jan Kacetl, Kaiserslautern (DE); Daniel Simon, Ludwigsburg (DE); Malte Jaensch, Bietigheim-Bissingen (DE); Eduard Specht, Bruchsal (DE); Hermann Helmut Dibos, Remchingen (DE); Axel Weyland, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 58 days.

(21) Appl. No.: 17/363,196

(22) Filed: Jun. 30, 2021

(65) Prior Publication Data
US 2022/0006373 A1    Jan. 6, 2022

(30) Foreign Application Priority Data
Jul. 1, 2020    (DE) .................... 10 2020 117 264.8

(51) Int. Cl.
*H02M 1/08*      (2006.01)
*H02M 7/483*     (2007.01)
*H02M 7/537*     (2006.01)

(52) U.S. Cl.
CPC ............. *H02M 1/08* (2013.01); *H02M 7/483* (2013.01); *H02M 7/537* (2013.01)

(58) Field of Classification Search
CPC ......... H02M 1/08; H02M 7/483; H02M 7/537
(Continued)

(56) References Cited

U.S. PATENT DOCUMENTS 9,502,960  B2 *  11/2016  Weyh .................. H02M 7/4835
10,700,587 B2 *   6/2020  Götz ....................... H02M 3/06
(Continued)

FOREIGN PATENT DOCUMENTS

CN    105429495 A    3/2016
DE    10103031 A1    7/2002
(Continued)

OTHER PUBLICATIONS

Goetz, S., et al., "Concept of a distributed photovoltaic multilevel inverter with cascaded double H-bridge topology," Apr. 2, 2019, vol. 110, pp. 667-678, XP085665313, International Journal of Electrical Power and Energy Systems.
(Continued)

*Primary Examiner* — Yemane Mehari
(74) *Attorney, Agent, or Firm* — RatnerPrestia

(57) ABSTRACT

A method for switching control of a multi-level converter. The multi-level converter has a plurality of modules. A total switching state is formed from respective module switching states of the plurality of modules by the switching control. A current state of charge of all energy stores of the multi-level converter is provided continuously to the switching control. The switching control is divided into an offline part and an online part, wherein, in the offline part, a plurality of offline switching tables is calculated by way of optimizers in a continuous sequence and, for calculation of a respective offline switching table of the plurality of offline switching tables, a respective cost function is minimized according to at least one predefined offline optimization criterion for evaluating the total switching state. In the online part, an online switching table is selected from the plurality of offline switching tables in a continuous sequence.

10 Claims, 2 Drawing Sheets

(58) Field of Classification Search
USPC .......................................................... 363/131
See application file for complete search history.

(56) References Cited

U.S. PATENT DOCUMENTS

| | | | | |
|---|---|---|---|---|
| 10,790,743 | B2* | 9/2020 | Götz | ..................... H02M 3/155 |
| 2014/0028266 | A1* | 1/2014 | Demetriades | ........... H02M 7/49 |
| | | | | 320/136 |
| 2017/0123014 | A1* | 5/2017 | Goetz | ................... H02J 7/0024 |
| 2019/0115849 | A1* | 4/2019 | Götz | ........................ B60L 58/22 |

FOREIGN PATENT DOCUMENTS

| | | |
|---|---|---|
| DE | 102015112512 A1 | 2/2017 |
| DE | 102016112250 A1 | 1/2018 |
| DE | 102018125728 B3 | 2/2020 |

OTHER PUBLICATIONS

Goetz et al., "Modular Multilevel Converter with Series and Parallel Module Connectivity: Topology and Control", IEEE Transactions on Power Electronics, vol. 30, No. 1, Jan. 2015, pp. 203-215.
Li et al., "Predictive Control of Modular Multilevel Series/Parallel Converter for Battery Systems", IEEE Energy Conversion Congress and Exposition (ECCE) 2017, pp. 5685-5691.

\* cited by examiner

METHOD AND SYSTEM FOR PRESELECTING SWITCHING STATES FOR A MULTI-LEVEL CONVERTER

CROSS-REFERENCE TO RELATED APPLICATION

This application claims priority to German Patent Application No. 10 2020 117 264.8, filed Jul. 1, 2020, the content of such application being incorporated by reference herein in its entirety.

FIELD OF THE INVENTION

The present invention relates to a method for switching control of a multi-level converter, in particular for the real-time control thereof. A system for implementing said switching control is also claimed.

BACKGROUND OF THE INVENTION

In order to obtain an AC voltage of predetermined frequency from a DC voltage, in a conventional power electronics system having a small number of power switches, input and output voltages are switched between a small number of levels, usually two or three, in order to obtain the desired variable on average. In contrast thereto, modern multi-level converters operate according to a scheme of generating the AC voltage by means of a dynamic changeable configuration of energy stores, such as capacitors or energy cells, for example, which are interconnected via a multiplicity of electronic switches. In this case, use is made of significantly more electronic switches, e.g. power semiconductor switches, than in a conventional power electronics system, which makes it possible to form a multiplicity of realizable total switching states and associated output voltages of the multi-level converter with very fine gradations or levels.

In principle, it is possible to define a respective design of a multi-level converter on the basis of an individual module, e.g. presented in the document DE 10 2015 112 512 A1, which is incorporated by reference herein, in the name of the present applicant. Depending on the circuit arrangement of the switching elements comprised by an individual module, all switching states relating to an interconnection of the energy store likewise comprised can be attained independently of structurally identical individual modules that are additionally connected.

US 2017/0123014 A1, which is incorporated by reference herein, discloses a dynamic change in the connectivity of individual battery components. As a result, a plurality of energy stores are interconnected.

CN 105429495 A, which is incorporated by reference herein, describes a change between series or parallel connection of adjacent modules of a modular multi-level converter in real time. In this case, switching losses can be greatly reduced.

US 2014/0028266 A1, which is incorporated by reference herein, discloses a device of a modular multi-level converter that comprises a control block for battery modules. A selection of an interconnection of battery modules is made depending on a requested power.

SUMMARY OF THE INVENTION

A basic problem in the control of modular multi-level converters is the high number of degrees of freedom, i.e. the multiplicity of different switching or module states, which initially form the same voltage. A totality of the module states defines an output voltage of the multi-level converter. For operation of the multi-level converter, a control unit of the switching control, a so-called scheduler, has to define and actively control the states of all modules at every point in time. Such state determination and allocation to all switches of all modules take place at a clock frequency of between 1 kHz and 1 MHz, corresponding to 1000 to 1 million times per second.

A real-time optimization method which determines a mathematical optimization in accordance with a present state of all energy stores of the multi-level converter and/or further conceivable constraints, such as uniform loading of the energy stores, for example, would be advantageous here. For a genuine mathematical optimization, in principle all possible switching states, e.g. in the case of ten MMSPC-like modules having at least five switching states per module, in total $5^{10}$ and thus almost $10^7$ equals 10 million possible switching states, per time step would have to be calculated and weighed against one another. A certain number of time steps into the future would then have to be calculated in order to find a best solution in this regard. In the case of M time steps, that would be $(5^{10})^M$ alternatives. Just a calculation for two time steps, with already approximately $10^{21}$ alternatives, would far exceed the limits of a high-performance computer ($10^{15}$ operations per second). Therefore, none of the existing methods hitherto has been able to cope with this colossal computational complexity. Heuristic methods, on the other hand, may indeed—depending on complexity—arrive at solutions online, but these will always also be at a certain distance from an optimum total switching state.

An energy store may also be referred to herein as energy storage. The energy store may be a battery or capacitor, for example.

Against this background, described herein is a method for control of switching states of all switches of a multi-level converter which online, i.e. during operation of the multi-level converter in real time, for a respective voltage requirement, calculates a respective optimum total switching state of the multi-level converter in accordance with predefined constraints and provides it to a controller of the multi-level converter. An associated system is also intended to be presented.

As shown in FIGS. 1 and 2, more particularly, a method for switching control of a multi-level converter 100 is proposed, in which the multi-level converter 100 has a plurality of modules 202, in which a respective module 202 of the plurality of modules has at least one terminal 14a, 14b on a first side and at least one terminal 18a, 18b on a second side, at least two controllable switches 16-7 and 16-1 and at least one energy store 12. In one embodiment, in a first connection between the at least one terminal 14a on the first side and the at least one terminal 18b on the second side, the at least one energy store 12 is arranged in series with a first 16-7 of the at least two controllable switches, and, in a second connection, a second 16-1 of the at least two controllable switches is arranged between the at least one terminal 14a on the first side and the at least one terminal 18a on the second side. By virtue of this embodiment, between the first and second terminal of the respective module of the plurality of modules, the energy store can be connected in series, or it can be bypassed, or an electrical line can be completely interrupted. In a further embodiment, the respective module of the plurality of modules has at least two terminals 14a, 14b on the first side and at least two terminals 18a, 18b on the second side. The at least one energy store 12 is arranged directly between the at least two terminals of the first side or of the second side, a first of the at least two controllable switches 16-7 is arranged between a first terminal 14b on the first side and a first terminal 18b on the second side, and a second 16-1 of the at least two controllable switches is arranged between a second terminal 14a on the first side and a second terminal 18a on the second side. By virtue of this embodiment, in the closed state of the at least two switches 16-1, 16-7, the energy store 12 of the respective module of the plurality of modules can be connected in parallel with further modules of the plurality of modules 10, wherein a series connection or a bypass of the energy store is furthermore possible by means of other switching states. By virtue of respective switch positions of the at least two controllable switches, each module of the plurality of modules has a respective module switching state. A total switching state is formed from respective module switching states of the plurality of modules by the switching control. A current state of charge of all energy stores of the multi-level converter is continuously provided to the switching control. The switching control is divided into an offline part and an online part. In the offline part, a plurality of offline switching tables are calculated by way of an optimizer in a continuous sequence and, for calculation of a respective offline switching table of the plurality of offline switching tables, a respective cost function according to at least one respectively predefined offline optimization criterion for an evaluation of the total switching state is minimized. In the online part, an online switching table is selected from the plurality of offline switching tables in a continuous sequence according to a predefined online selection criterion, a respective voltage level is assigned to a respective voltage requirement by way of a modulator for each time step in real time, a respective total switching state is identified based on the selected online switching table for the respective voltage level by way of a scheduler and is passed on to all modules.

A central multi-level converter, based on which the method according to aspects of the invention can advantageously be executed, is the modular multi-level converter MMSPC, described by S. M. Goetz, A. V. Peterchev and T. Weyh, "Modular Multilevel Converter With Series and Parallel Module Connectivity: Topology and Control," in IEEE Transactions on Power Electronics, vol. 30, no. 1, pp. 203-215, January 2015 and also in documents U.S. Pat. No. 9,502,960 B2 and DE 10 2016 112 250 A1. This converter is distinguished vis a vis conventional modular multi-level converters, described e.g. by R. Marquardt in the document DE 101 03 031 A1, and to which the invention is likewise applicable, by virtue of the existence of an additional parallel state, whereby an MMSPC in a phase section can generate and dynamically change almost any desired electrical serial-parallel circuit configuration of module-integrated energy stores. Furthermore, a bypass state, referred to as a bypass, is usually available as well in order to bypass the energy store of a module. Generally, in modular multi-level converters, a module switching state, that is to say the switching states of the switches of the individual module, can be uniquely described in accordance with the following list: parallel, serial, bypass, switched off. One application is represented by a modular multi-phase multi-level converter in which a number of modules in each case are arranged in a phase section, wherein a respective phase section then provides a respective phase of a multi-phase AC voltage.

A respective switching table, also referred to as look-up table, allocates a combination of switch positions in the respective modules to each of the, in the case of N modules usually (2N+1), voltage levels to be represented at the output of the multi-level converter, wherein the respective switch positions combined within a respective module are designated as a respective module switching state. The respective module switching state of a respective module substantially always involves how the energy store comprised by the respective module is interconnected with the further energy stores of the multi-level converter. From the online switching table, the scheduler, for a voltage level that has been quantized and transferred to it by the modulator, seeks a total switching state which is or can be defined by the respective module switching states. Therefore, for example for the aforementioned MMSPC, in the case of a respective module with eight semiconductor switches ($S_1$, $S_2$, $S_3$, $S_4$, $S_5$, $S_6$, $S_7$, $S_8$), arranged on two sides each with two half-bridges on one side, an energy store located at input terminals and combined at a high-side connection and a low-side connection, a total of five module switching states are defined, for which the eight switches assume the switch positions stated in table 1. The module switching states are as follows: "s+" for serial interconnection with positive polarity, "s−" for serial interconnection with negative polarity, "p" for parallel interconnection, "b+" for bypass with positive polarity, and "b−" for bypass with negative polarity. In this case, the positive or respectively negative polarity denotes which polarity of the two terminals on the first side of the module is switched through to the two terminals on the second side of the module. In the case of the bypass or a module bypass, this is tantamount to switching through via the high-side connection, or the low-side connection, of the switches of the exemplary module that are arranged in half-bridges.

TABLE 1

Module switching states s+, s−, p, b+, b−
and respective switch positions of the eight switches
S1 to S8 from the exemplary module of an MMSPC described in the text.

| | $S_1$ | $S_2$ | $S_3$ | $S_4$ | $S_5$ | $S_6$ | $S_7$ | $S_8$ |
|---|---|---|---|---|---|---|---|---|
| s+ | ON | OFF | ON | OFF | OFF | ON | OFF | ON |
| s− | OFF | ON | OFF | ON | ON | OFF | ON | OFF |
| p | ON | OFF | OFF | ON | ON | OFF | OFF | ON |
| b+ | ON | OFF | ON | OFF | ON | OFF | ON | OFF |
| b− | OFF | ON | OFF | ON | OFF | ON | OFF | ON |

Between a first extreme with a scheduler with real-time capability and only one single look-up table from which the next module switching state (of all modules) can be read out given a fixed assignment according to a plurality of conditions, and a second extreme with full optimization, that is to say test of all switching state alternatives and evaluation of the best switching states according to predefined optimization criteria, the method according to aspects of the invention offers a mix of the two extreme cases, which can also be considered as a hybrid solution. In the offline part, there furthermore takes place an optimization, which can proceed with a fixed speed ratio with respect to the online part, but does not have to do so, that is to say can be asynchronous. This optimization now generates a plurality of alternative switching tables with a plurality of alternative module switching states, however. It is thus possible to select from these alternatives in the online part with only little computational outlay in real time.

In one embodiment of the method according to aspects of the invention, the respective predefined online selection criterion and/or the respective predefined offline optimization criterion for the evaluation of the overall switching state by the cost function is selected at least from the following list: minimum current loading of a respective energy store, uniform discharge of all energy stores of the multi-level converter, minimum on-state losses, minimum losses in the energy stores, minimum total losses. If, for example, a uniform discharge of all energy stores is selected as an online selection criterion in order to configure the discharge of a single module close to the discharge state averaged over all modules, this takes place in a short-term average. In contrast, in the offline part with the optimizer without real-time capability, only a long-term average can be achieved for the same uniform discharge of all energy stores but which is now selected as offline optimization criterion. A further example that can be mentioned is the minimum current loading of a respective energy store mentioned above, which is as low as possible but, from a period, above all should be below a second, even better only a multiple of 100 ms or even smaller.

In a further embodiment of the method according to aspects of the invention, a selection of integer M offline switching tables from the plurality of offline switching tables with a similar minimization value of the cost function is provided. This achieves a situation in which the provided alternatives constitute a random selection with identical or similarly good cost function values.

In another embodiment of the method according to aspects of the invention, a respective offline switching table, provided by the optimizer, from the plurality of offline switching tables has been optimized for a respectively different offline optimization criterion. This achieves a situation in which a respective selection from the provided plurality of offline switching tables already optimizes a respective target.

In another embodiment of the method according to aspects of the invention, the online switching table is selected again from the plurality of online switching tables at each time step.

In still another embodiment of the method according to aspects of the invention, an offline optimization criterion other than the respective offline optimization criterion for calculating the plurality of offline switching tables is selected as online selection criterion for selecting the online switching table from the plurality of online switching tables. The respective alternative online switching tables can be identified, for example, so that the optimums from the target functions of the asynchronous offline part, for example the best integer K, are again subjected to an evaluation with respect to a further target, and, of those, integer L can be selected to be smaller than K. This further target can deviate from one another, for example with respect to a current load of individual modules. However, simply a target that is complementary to the first selected target, for example the modules in the offline optimization criterion as very highly loaded by discharge current, in the further target therefor as loaded to a very below-average degree, would also be conceivable as a further target.

In another embodiment of the method according to aspects of the invention, a number N of switching vectors corresponding to the number N of modules is calculated for a predefined offline optimization criterion. Respective optimum switch positions according to the predefined offline optimization criterion are shown by way of a respective switching vector of the number N of switching vectors for a respective module of the number N of modules. A respective switching vector of the number N of said switching vectors corresponds to a respective offline switching table of a number N of the plurality of offline switching tables, wherein the number N of the plurality of offline switching tables spans a complete vector space.

In still another embodiment of the method according to aspects of the invention, the online switching table is provided by a linear combination of the number N of the plurality of offline switching tables, said linear combination being distributed into proportions of time steps. A respective linear coefficient is calculated according to the predefined online selection criteria and a scalar value of the respective linear coefficient corresponds to a respective proportion of time steps in a temporal profile of a plurality of time steps. In such a method, however, it is not ensured that weighting of the respective number N of the plurality of offline switching tables in the linear combination is equal for balancing, for example, of the current loading. Accordingly, another solution can select the alternatives so that an equally long use of each alternative on average over time leads to relatively balanced current loading of the individual energy stores.

In still another embodiment of the method according to aspects of the invention, after a selection of an online switching table, in each further time step the module switching states respectively allocated to the individual modules are each permuted for the next module of a module phase section.

Alternatives to an existing module configuration can also be generated systematically. Since such a process is very quick and can guarantee a finite execution time, it can also be carried out in the online part. Accordingly, the previous asynchronous part (slow/without real-time capability) of the scheduler can also be used as an alternative solution approach and only the part with real-time capability can be modified. In this case, how many intermodule connections are in which model switching state (e.g. 3 s+, 1 p, 1 b+) is extracted from an existing total switching state, wherein a piece of position information of each module switching state (that is to say at which intermodule connection which module switching state is now present) is forgotten. The alternatives are now generated by redistributing the module switching states across intermodule connections. The online part now uses for example initially the module switching state recorded in the look-up table for the current conditions. This can be marked (either by a flag or a counter) after it has been used. Should the scheduler wish to use this module switching state a further time (or more than a certain number or with each second use) before an updating of the table, this is identified at the marker or the counter and the module switching state is varied by resorting. The module store load can advantageously be distributed very quickly in this way.

Furthermore, it can always be enforced that a best solution, for example with minimum value of the cost function, is always part of the plurality of online switching tables.

Also claimed is a system for switching control of a multi-level converter, in which the multi-level converter has a plurality of modules. A respective module of the plurality of modules has at least one terminal on a first and at least one terminal on a second side, at least two controllable switches and at least one energy store. In a first configuration, in a first connection between the at least one terminal on the first side and the at least one terminal on the second side, the at least one energy store is arranged in series with a first of the at least two controllable switches, and, in a second connection, a second of the at least two controllable switches is arranged between the at least one terminal on the first side and the at least one terminal on the second side. By virtue of this configuration, between the first and second terminal of the respective module of the plurality of modules, the energy store can be connected in series, or it can be bypassed, or an electrical line can be completely interrupted. In a second configuration, the module of the plurality of modules has at least two terminals on the first side and at least two terminals on the second side. The at least one energy store is arranged directly between the at least two terminals of the first side or of the second side, and a first of the at least two controllable switches is arranged between a first terminal on the first side and a first terminal on the second side. A second of the at least two controllable switches is arranged between a second terminal on the first side and a second terminal on the second side. Each module of the plurality of modules has a respective module switching state through respective switch positions of the at least two control switches. An overall switching state is formed from respective module switching states of the plurality of modules by the switching control. The system comprises a modulator 10 and a scheduler 40 and a current state of charge of all energy stores of the multi-level converter is continuously provided to the switching control. The switching control 3 is divided into an offline part 2 and an online part 1 is configured, in the offline part, to calculate a plurality of offline switching tables by way of an optimizer in a continuous sequence and, for calculation of a respective offline switching table of the plurality of offline switching tables, to minimize a respective cost function according to at least one respectively predefined offline optimization criterion for an evaluation of the overall switching state. The switching control is further configured, in the online part, to select an online switching table from the plurality of offline switching tables in a continuous sequence according to a predefined online selection criterion, to assign a respective voltage level to a respective voltage requirement by a modulator 10 for each time step in real time, and to identify a respective total switching state based on the selected online switching table for the respective voltage level by a scheduler and to pass it on to all modules.

In one configuration of the system according to aspects of the invention, the system is designed to execute a method according to aspects of the invention.

BRIEF DESCRIPTION OF THE DRAWING FIGURES

Further advantages and configurations of the invention emerge from the description and from the appended drawing.

It is understood that the features mentioned above and the features yet to be discussed below may be used not only in the respectively specified combination but also in other combinations or individually without departing from the scope of the present invention.

DETAILED DESCRIPTION OF THE INVENTION

Figure 1:
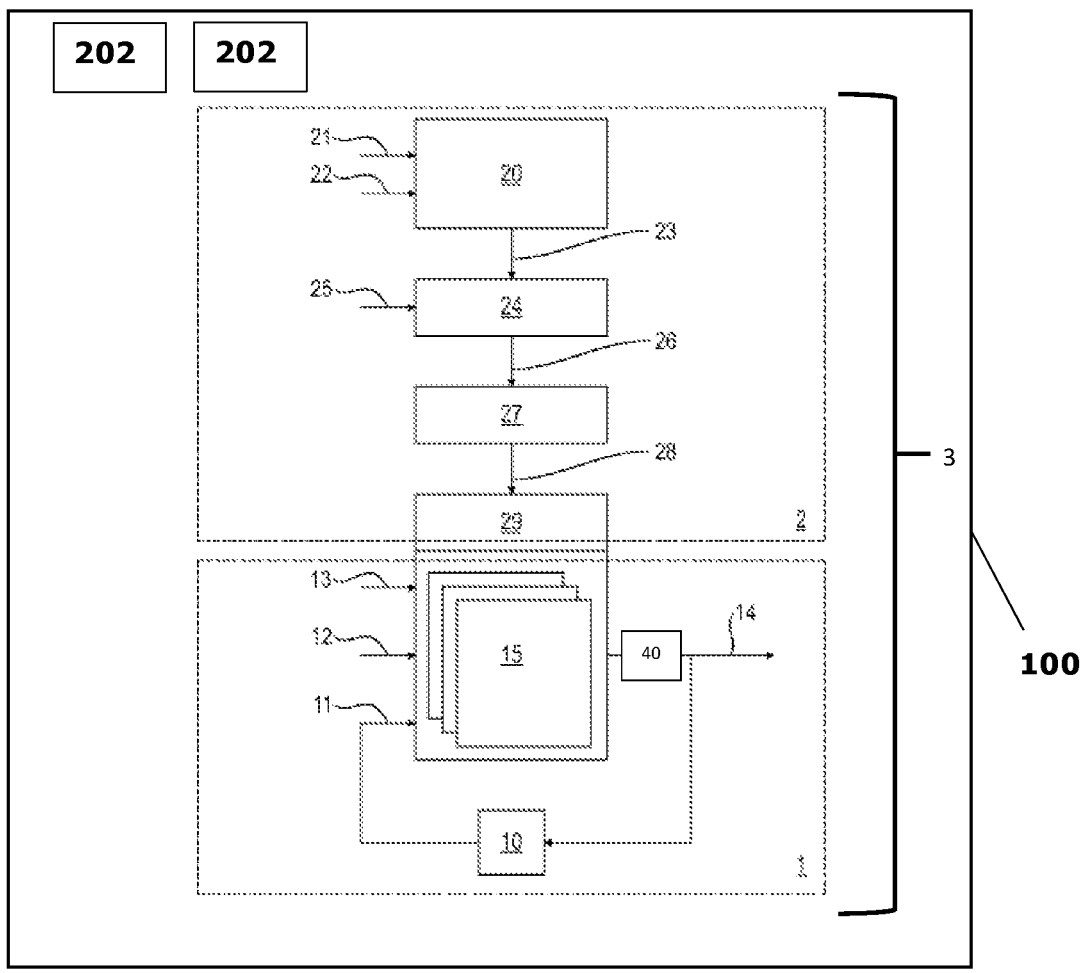
FIG. 1 shows a schematic illustration of a multi-level converter including an online and offline part of switching control according to an embodiment of the method according to aspects of the invention.
Figure 2:
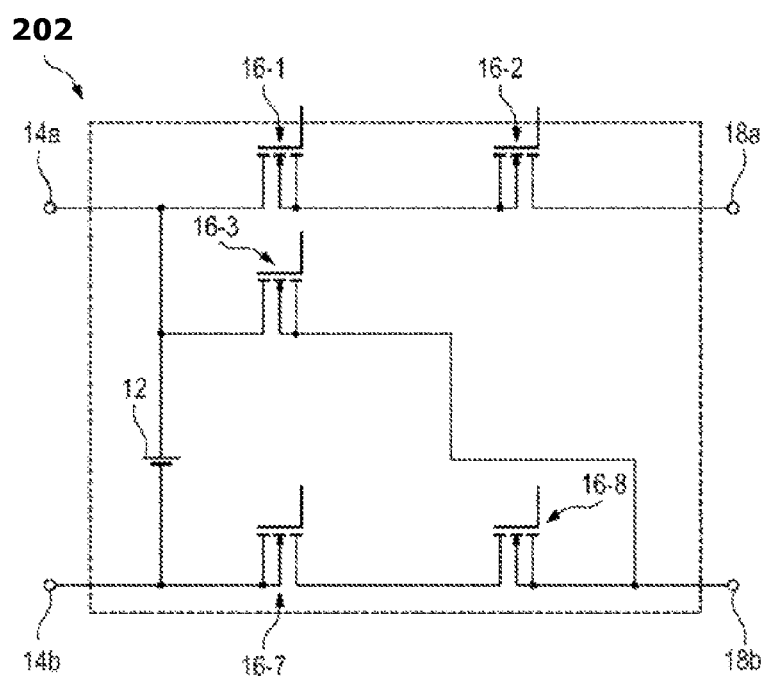
FIG. 2 depicts a schematic of an individual module of the multi-level converter of FIG. 1, which figure is reproduced from DE102015112512.

FIG. 1 shows a schematic illustration of an online part 1, also referred to as high-speed loop, and an offline part 2, also referred to as low-speed loop, of switching control 3 of a modular multi-level converter 100 according to an embodiment of the method according to aspects of the invention. In the offline part 2, a plurality of solutions are calculated to form a respective cost function. For this purpose, those switch positions that can implement a respective possible module switching state 21 and a voltage difference 22 to be switched are retrieved in a table with all available total switching states 20. In this case, for example six possible module switching states, which can implement the predefined conditions 21, 22, are output as result 23. These are used to calculate a cost function 24 according to a respective offline optimization criterion, wherein in this case, for example, a current direction 25 of a phase section with the respective modules is also included. Therefore, in the example of six module switching states 23 found, a total of two times six, that is to say 12, values 26 of the cost function 24 are output. Of these 12 values 26, for example those (two on account of the current direction) module switching states 28 that have a minimal cost function value 27 among the values 26 are determined. These module switching states 28 with respect to the two current directions form the offline switching tables 29 calculated in the offline part 2, which, for example, are calculated for each possible constellation of predefined conditions 21, 22 or a sub-selection thereof and thus provide a plurality of offline switching tables 29. In the online part 1, it is now possible to resort to the provided plurality of offline switching tables 29 with a significantly lower degree of computation outlay. For a total switching state 14 respectively requested or to be output, for example predetermined by a sinusoidal reference signal, a modulator 10 predetermines a certain voltage level that is to be output by the modular multi-level converter, which voltage level is formed from a current module switching state 11, in the case of a predefined voltage difference 12 and current direction 13 according to an online switching table from the plurality of online switching tables 15. The respective online switching table can be selected from the plurality of online switching tables according to an online selection criterion.

The online and offline parts may comprise separate or individual processors for performing the above described operations.

What is claimed:

1. A method for switching control of a multi-level converter, wherein the multi-level converter has a plurality of modules, in which each module of the plurality of modules has at least one terminal on a first side and at least one terminal on a second side, at least two controllable switches and at least one energy store, in which, in a first connection between the at least one terminal on the first side and the at least one terminal on the second side, the at least one energy store is arranged in series with a first of the at least two controllable switches, and, in a second connection, a second of the at least two controllable switches is arranged between the at least one terminal on the first side and the at least one terminal on the second side, in which each module of the plurality of modules has a respective module switching state by way of respective switch positions of the at least two controllable switches, in which a total switching state is formed from respective module switching states of the plurality of modules by way of the switching control, wherein a current state of charge of all energy stores of the multi-level converter is provided continuously to the switching control, in which the switching control is divided into an offline part and an online part, said method comprising:

operating the offline part to calculate a plurality of offline switching tables by an optimizer in a continuous sequence while minimizing a respective cost function for each offline switching table according to at least one respectively predefined offline optimization criterion for an evaluation of the overall switching state; and
operating the online part to:
(i) select an online switching table from the plurality of offline switching tables in a continuous sequence according to a predefined online selection criterion,
(ii) assign a respective voltage level to a respective voltage requirement by way of a modulator for each time step in real time,
(iii) identify a respective total switching state based on the selected online switching table for the respective voltage level by way of a scheduler, and
(v) pass the respective total switching state on to all of the modules of the plurality of modules.

2. The method as claimed in claim 1, wherein the respective predefined online selection criterion and/or the respective predefined offline optimization criterion for the evaluation of the total switching state by way of the cost function is selected at least from the following list: minimum current loading of a respective energy store, uniform discharge of all energy stores of the multi-level converter, minimum on-state losses, minimum losses in the energy stores, minimum total losses.

3. The method as claimed in claim 1, further comprising providing a selection of integer M offline switching tables from the plurality of offline switching tables with a similar minimization value of the cost function.

4. The method as claimed in claim 1, further comprising optimizing for a respectively different offline optimization criterion a respective offline switching table, provided by the optimizer, from the plurality offline switching tables.

5. The method as claimed in claim 1, further comprising selecting the online switching table again from the plurality of online switching tables at each time step.

6. The method as claimed in claim 1, further comprising selecting as online selection criterion for selecting the online switching table from the plurality of online switching tables an offline optimization criterion other than the respective offline optimization criterion for calculating the plurality of offline switching tables.

7. The method as claimed in claim 1, wherein a number N of switching vectors corresponding to the number N of modules is calculated for a predefined offline optimization criterion, wherein respective optimum switch positions according to the predefined offline optimization criterion are shown by way of a respective switching vector of the number N of switching vectors for a respective module of the number N of modules, wherein a respective switching vector of the number N of said switching vectors corresponds to a respective offline switching table of a number N of the plurality of offline switching tables and the number N of the plurality of offline switching tables spans a complete vector space.

8. The method as claimed in claim 7, wherein the online switching table is provided by a linear combination of the number N of the plurality of offline switching tables, said linear combination being distributed into proportions of time steps, wherein a respective linear coefficient is calculated according to the predefined online selection criteria and a scalar value of the respective linear coefficient corresponds to a respective proportion of time steps in a temporal profile of a plurality of time steps.

9. The method as claimed in claim 1, wherein after a selection of an online switching table from the plurality of online switching tables, in each further time step the module switching states respectively allocated to the individual modules are each permuted for the next module of a module phase section.

10. A system for switching control of a multi-level converter having a plurality of modules, in which each module of the plurality of modules has (i) at least one terminal on a first side (ii) at least one terminal on a second side, (iii) at least two controllable switches and (iv) at least one energy store,
wherein, in a first connection between the at least one terminal on the first side and the at least one terminal on the second side, the at least one energy store is arranged in series with a first of the at least two controllable switches, and,
wherein, in a second connection between the at least one terminal on the first side and the at least one terminal on the second side, a second of the at least two controllable switches is arranged between the at least one terminal on the first side and the at least one terminal on the second side,
wherein each module of the plurality of modules has a respective module switching state by way of respective switch positions of the at least two controllable switches, in which a total switching state is formed from respective module switching states of the plurality of modules by way of the switching control,
wherein the system further comprises a modulator and a scheduler,
wherein a current state of charge of all energy stores of the multi-level converter is provided continuously to the switching control,
wherein the switching control is divided into an offline part and an online part,
wherein the offline part is configured to calculate a plurality of offline switching tables by way of an optimizer in a continuous sequence while minimizing a respective cost function for each offline switching table according to at least one respectively predefined offline optimization criterion for an evaluation of the overall switching state, and
wherein the online part is configured to:
(i) select an online switching table from the plurality of offline switching tables in a continuous sequence according to a predefined online selection criterion,
(ii) allocate a respective voltage level to a respective voltage requirement by way of a modulator for each time step in real time,
(iii) identify a respective total switching state based on the selected online switching table for the respective voltage level by way of a scheduler, and
(iv) pass the respective total switching state on to all modules.

* * * * *